(12) United States Patent
Umemura et al.

(10) Patent No.: US 6,793,207 B2
(45) Date of Patent: Sep. 21, 2004

(54) LIQUID-CONFINED VIBRATION ISOLATOR

(75) Inventors: Satoshi Umemura, Gifu-ken (JP); Takehiro Okanaka, Kasugai (JP)

(73) Assignee: Tokai Rubber Industries, Ltd., Aichi-ken (JP)

( * ) Notice: Subject to any disclaimer, the term of this patent is extended or adjusted under 35 U.S.C. 154(b) by 0 days.

(21) Appl. No.: 10/280,371

(22) Filed: Oct. 25, 2002

(65) Prior Publication Data

US 2003/0080483 A1 May 1, 2003

(30) Foreign Application Priority Data

| Oct. 26, 2001 | (JP) | ......... | 2001-328601 |
| Sep. 13, 2002 | (JP) | ......... | 2002-268913 |
| Oct. 15, 2002 | (JP) | ......... | 2002-299901 |

(51) Int. Cl.$^7$ ............................................. F16F 15/08
(52) U.S. Cl. ................................ 267/140.13; 267/220
(58) Field of Search ................ 267/140.11, 140.13, 267/214, 220

(56) References Cited

U.S. PATENT DOCUMENTS

| 5,571,263 A | * | 11/1996 | Koester et al. | ......... 267/140.13 |
| 5,628,498 A | * | 5/1997 | Nanno | ......... 267/140.13 |
| 5,700,000 A | * | 12/1997 | Wolf et al. | ......... 267/140.13 |
| 5,950,994 A | * | 9/1999 | Hosoya et al. | ......... 267/140.13 |
| 5,964,456 A | * | 10/1999 | Someya | ......... 267/140.13 |
| 6,036,183 A | * | 3/2000 | Lee et al. | ......... 267/140.13 |
| 6,311,964 B1 | * | 11/2001 | Suzuki | ......... 267/140.13 |
| 6,554,263 B2 | * | 4/2003 | Takashima et al. | .... 267/140.13 |

FOREIGN PATENT DOCUMENTS

| JP | 07-089356 A | 4/1995 |
| JP | 11-051117 A | 2/1999 |
| JP | 2000-297837 A | 10/2000 |
| JP | 2001-116080 A | 4/2001 |

* cited by examiner

Primary Examiner—Matthew C. Graham
(74) Attorney, Agent, or Firm—Akin Gump Strauss Hauer & Feld, L.L.P.

(57) ABSTRACT

A vibration isolator includes a first metallic mounting member; a metallic body member disposed away from the first metallic mounting member in the vibration input direction; an elastic body portion elastically connecting the first metallic mounting member and the metallic body member; and a second metallic mounting member. The metallic body member includes a flange portion protruding radially outward from a part of its end facing the first metallic mounting member and a first protrusion protruding radially outward from the remaining part of the end to a greater extent than does the flange portion. The opposite end of the metallic body member is plugged with a seal member to thereby form a liquid chamber within the metallic body member. The second metallic mounting member is fixedly press-fitted onto the metallic body member and includes a second protrusion. The first and second protrusions are superposed to thereby form a stopper portion. The stopper portion is covered and held by a stopper covering portion.

4 Claims, 14 Drawing Sheets

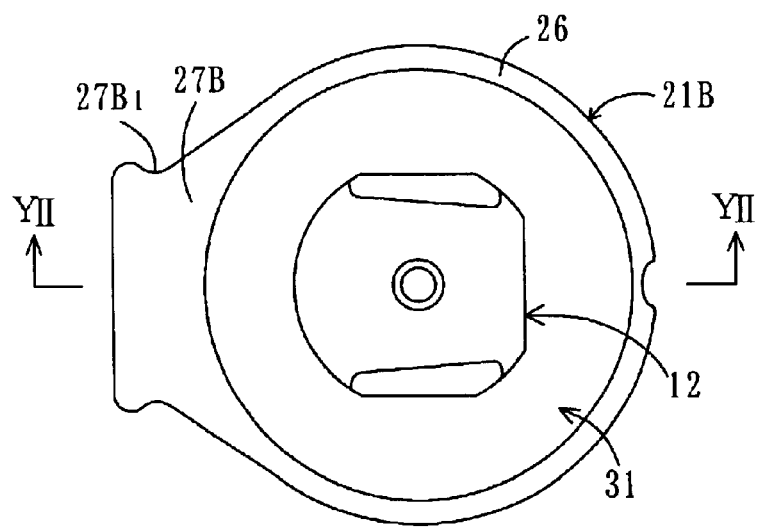
Fig. 23
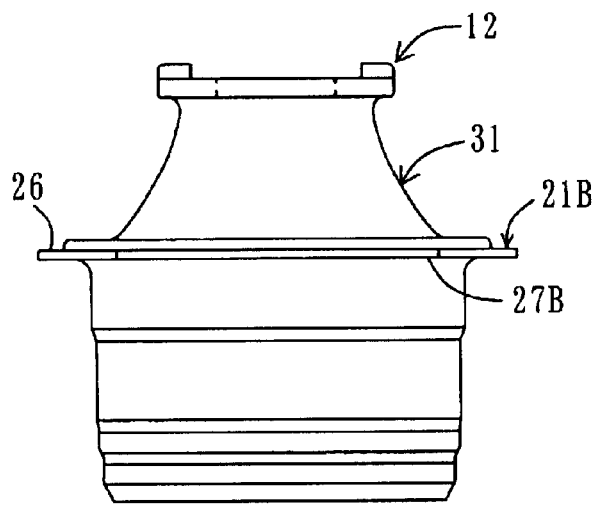
Fig. 24
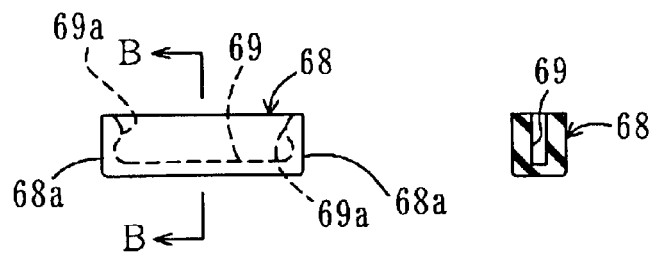 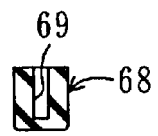
Fig. 25A          Fig. 25B

LIQUID-CONFINED VIBRATION ISOLATOR

BACKGROUND OF THE INVENTION

1. Field of the Invention

The present invention relates to a liquid-confined vibration isolator for use as an engine mount of a vehicle or a like device.

2. Description of the Related Art

A conventionally known liquid-confined vibration isolator is disclosed in, for example, Japanese Patent Application Laid-Open (kokai) No. H07-89356. The liquid-confined vibration isolator includes an upper metallic mounting member and a metallic body member, which are disposed away from each other, and a rubber elastic-body for elastically connecting the upper metallic mounting member and the metallic body member. The vibration isolator further includes a stopper portion extending outward from the metallic body member, and a stabilizer extending from the upper metallic mounting member toward the stopper portion while a predetermined clearance is maintained therebetween. A lower metallic mounting member is fixedly crimped to a lower end portion of the metallic body member. The stopper portion is formed such that a flange portion of the metallic body member and a metallic stopper member are united while being superposed, by means of bending or like working. In the vibration isolator, contact between the stopper portion and the stabilizer prevents deformation of the rubber elastic-body in excess of a predetermined limit. Similarly configured liquid-confined vibration isolators are disclosed in, for example, Japanese Patent Application Laid-Open (kokai) Nos. 2000-297837 and 2001-116080.

The above-mentioned liquid-confined vibration isolator must use the discrete stabilizer in order to prevent excessive deformation of the rubber elastic-body, thus increasing its weight and rendering its assembly work complicated. Also, the lower metallic mounting member must be fixedly crimped to the lower end portion of the metallic body member, thereby rendering its mounting work complicated.

SUMMARY OF THE INVENTION

An object of the present invention is to solve the above-mentioned problems and to provide a liquid-confined vibration isolator capable of imparting sufficient strength to a stopper portion by a simple structure, without an accompanying increase in weight, and facilitating assembly work.

To achieve the above object, the present invention provides a liquid-confined vibration isolator comprising a first metallic mounting member; a cylindrical metallic body member disposed away from the first metallic mounting member in the vibration input direction, the metallic body member having a first protrusion protruding radially outward from one axial end thereof facing the first metallic mounting member; an elastic body portion elastically connecting the first metallic mounting member and the metallic body member and plugging the axial end of the metallic body member; a seal portion plugging an axially opposite end of the metallic body member to thereby define a liquid chamber in cooperation with the first metallic mounting member, the metallic body member and the elastic body portion; a cylindrical second metallic mounting member fixedly press-fitted onto the metallic body member and having a second protrusion protruding radially outward from one axial end thereof, the second protrusion and the first protrusion being superposed to thereby form a stopper portion; and a stopper-covering elastic-body portion covering the first and second protrusions of the stopper portion.

In the above-described liquid-confined vibration isolator, the stopper portion is formed through superposition of the first protrusion of the metallic body member and the second protrusion of the second metallic mounting member, thereby obviating use of a discrete stopper member. Therefore, the present invention can simplify the structure of the stopper portion and thus can form the stopper portion at low cost. Also, the structure of superposing the first protrusion of the metallic body member and the second protrusion of the second metallic mounting member imparts sufficient strength to the stopper portion, thereby allowing a weight reduction for the metallic body member and the second metallic mounting member and thus reducing the total weight of the vibration isolator. Further, in assembly of the vibration isolator of the present invention, the second metallic mounting member is fixedly press-fitted onto the metallic body member, thereby obviating complicated press working such as bending and crimping. As a result, the assembly of the vibration isolator is simplified, thereby reducing manufacturing cost. Also, the stopper portion is formed through superposition of the first protrusion of the metallic body member and the second protrusion of the second metallic mounting member, which are covered and held together by the stopper-covering elastic-body portion, thereby reliably preventing detachment of the second metallic mounting member from the metallic body member, which could otherwise result from vibration input to the vibration isolator and other factors.

Preferably, the stopper-covering elastic-body portion is formed integrally with the elastic body portion, thereby eliminating a step of forming a discrete stopper-covering elastic-body portion and thus reducing the manufacturing cost of the vibration isolator.

Preferably, the first and second protrusions constituting the stopper portion are disposed at the same circumferential position, and the stopper-covering elastic-body portion covers opposite side faces of the first and second protrusions in addition to opposite planar faces and protruding end faces of the first and second protrusions. Thus, when vibration is imposed on the vibration isolator in the direction connecting the opposite side faces of the stopper portion, the stopper-covering elastic-body portion that covers the opposite side faces prevents direct contact of the metallic stopper portion against an opponent member. By virtue of opponent members being disposed on opposite sides of the stopper portion with an appropriate distance away from the corresponding opposite side faces of the stopper portion, when excess vibration is imposed on the vibration isolator in the direction connecting the opposite side faces of the stopper portion, the stopper portion covered with the stopper-covering elastic-body portion comes into contact with the opponent members, thereby suppressing the intensity of vibration imposed on the vibration isolator within an appropriate range and thus ensuring the reliability of the vibration isolator.

Preferably, the stopper-covering elastic-body portion is a discrete member formed separately from the elastic body portion and is fixedly fitted onto the stopper portion formed through superposition of the first and second protrusions. Although an additional step is involved to form the discrete stopper-covering elastic-body portion separately from the elastic body portion, when the first protrusion and the second protrusion are to be superposed in the course of press-fitting the second metallic mounting member onto the metallic body member, a step of bending the covering elastic-body portion becomes unnecessary. Thus, press-fitting the second metallic mounting member onto the metallic body member can be simplified, and the stopper-covering elastic-body member can be fixedly fitted onto the stopper portion in an easy and reliable manner.

The present invention also provides a liquid-confined vibration isolator comprising a first metallic mounting member; a cylindrical metallic body member disposed away from the first metallic mounting member in the vibration input direction, the metallic body member having a protrusion protruding radially outward from one axial end thereof facing the first metallic mounting member; a reinforcement member extending radially outward along a back surface of the protrusion and being fixedly disposed while being superimposed on the back surface of the protrusion to thereby form a stopper portion in cooperation with the protrusion; an elastic body portion elastically connecting the first metallic mounting member and the metallic body member, plugging the axial end of the metallic body member, and covering the protrusion and the reinforcement member of the stopper portion; a seal portion plugging an axially opposite end of the metallic body member to thereby define a liquid chamber in cooperation with the first metallic mounting member, the metallic body member and the elastic body portion; and a cylindrical second metallic mounting member fixedly press-fitted onto the metallic body member and having a cutout formed therein so as to avoid interference with the reinforcement member.

In the above-described liquid-confined vibration isolator, the stopper portion is formed through superposition of the protrusion of the metallic body member and the reinforcement member, thereby obviating use of a discrete stopper member. Therefore, the present invention can simplify the structure of the stopper portion and thus can form the stopper portion at low cost. Also, the structure of superposing the protrusion of the metallic body member and the reinforcement member to form the unitary stopper portion imparts sufficient strength to the stopper portion, thereby allowing a weight reduction for the metallic body member and the reinforcement member and thus reducing the total weight of the vibration isolator. Further, in assembly of the vibration isolator of the present invention, the second metallic mounting member is fixedly press-fitted onto the metallic body member, thereby obviating complicated press working such as bending and crimping. As a result, the present invention allows simplification of the assembly of the vibration isolator, thereby reducing manufacturing cost.

BRIEF DESCRIPTION OF THE DRAWINGS

FIG. 23 is a plan view showing the mount body of FIG. 22;

FIG. 24 is a left-hand side view showing the mount body of FIG. 22;

FIGS. 25A and 25B are a plan view and a sectional view taken along line B—B of FIG. 25A, respectively, showing a stopper covering member;

DESCRIPTION OF THE PREFERRED EMBODIMENTS

Figure 1:
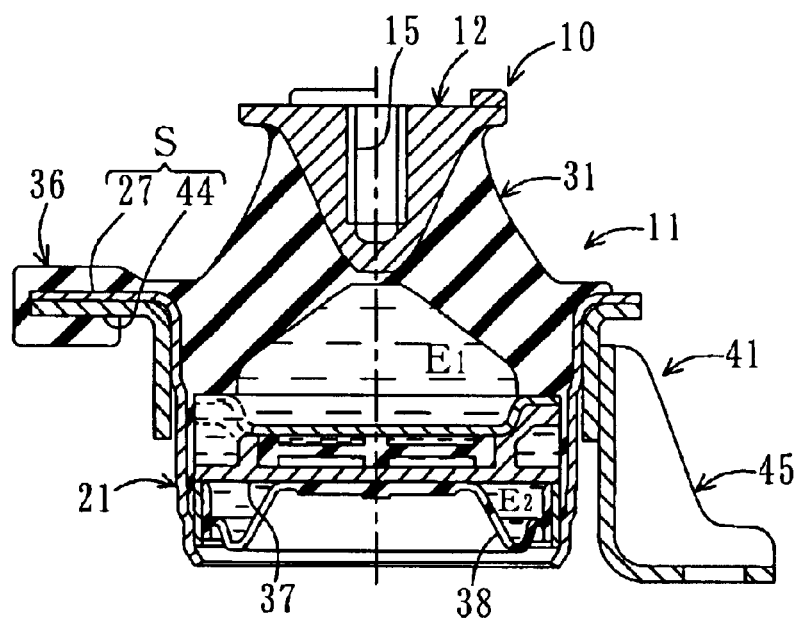
FIG. 1 is a sectional view taken along line I—I of FIG. 2, showing a liquid-confined vibration isolator according to a first embodiment of the present invention.
Figure 2:
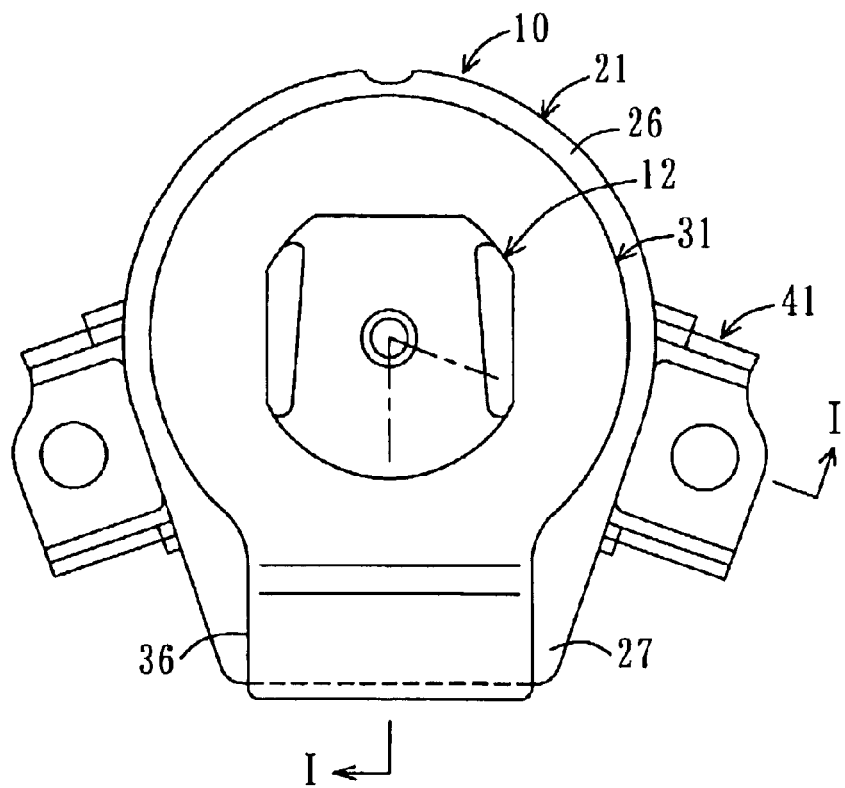
FIG. 2 is a plan view showing the vibration isolator.
Figure 3:
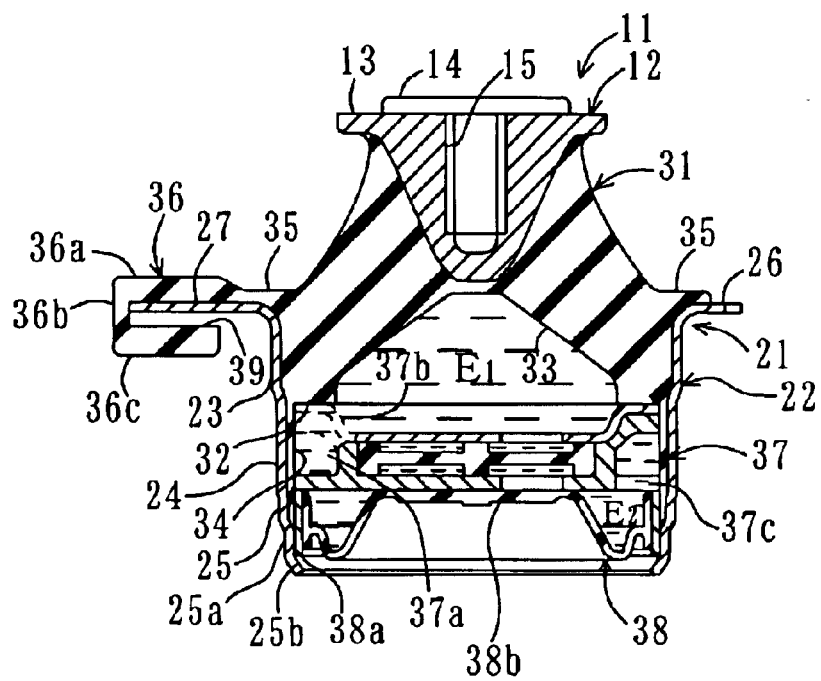
FIG. 3 is a sectional view taken along line III—III of FIG. 4, showing a mount body of the vibration isolator.
Figure 4:
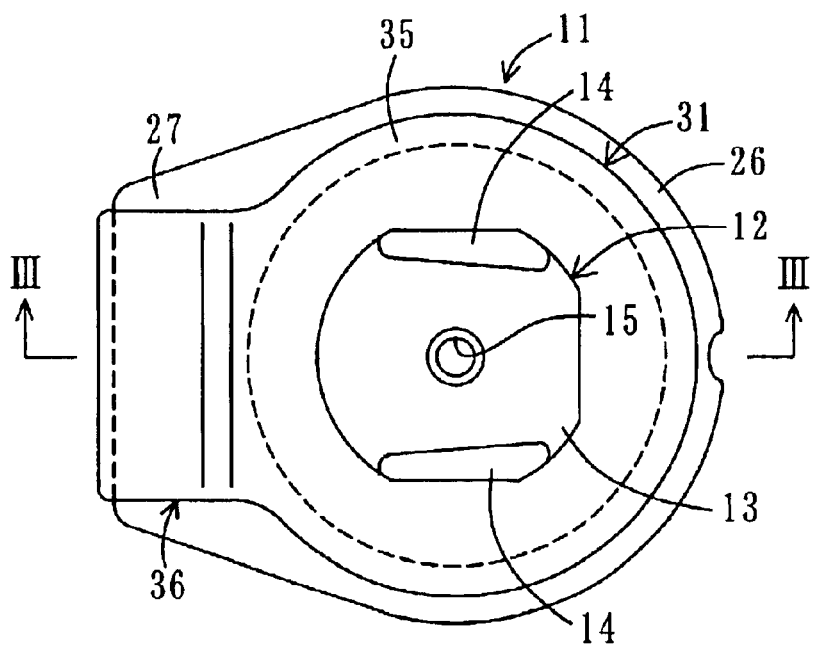
FIG. 4 is a plan view showing the mount body.
Figure 5:
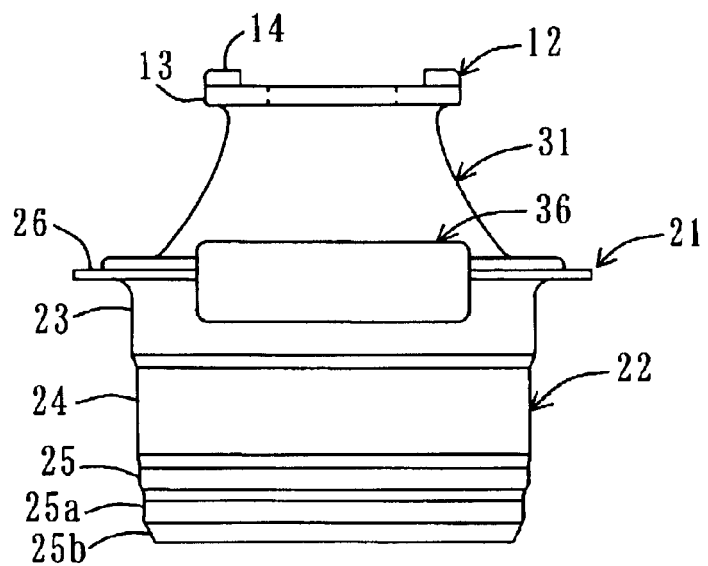
FIG. 5 is a left-hand side view showing the mount body of FIG. 4.
Figure 6:
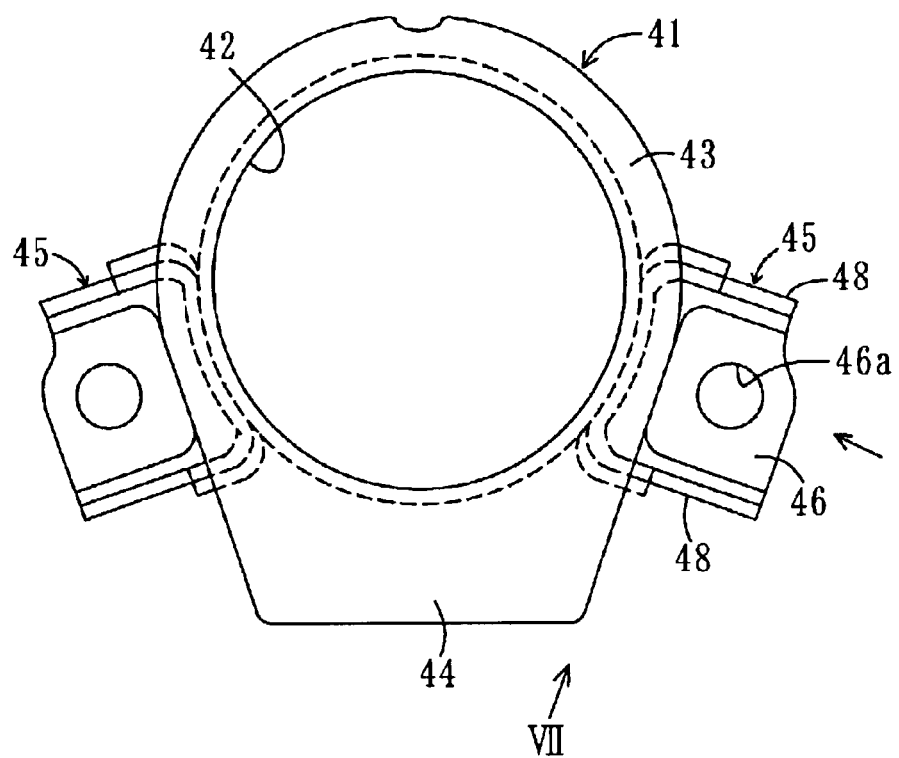
FIG. 6 is a plan view showing a second metallic mounting member of the vibration isolator.
Figure 7:
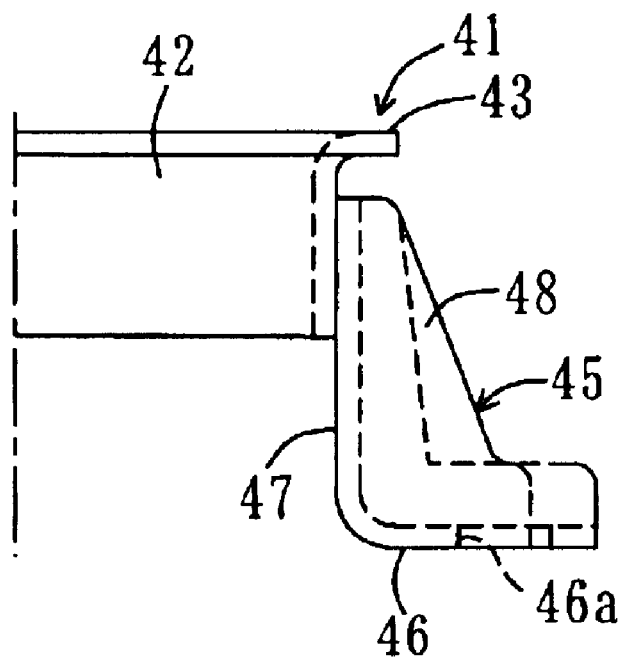
FIG. 7 is a view as viewed from the direction of arrow VII of FIG. 6, showing the second metallic mounting member.
Figure 8:
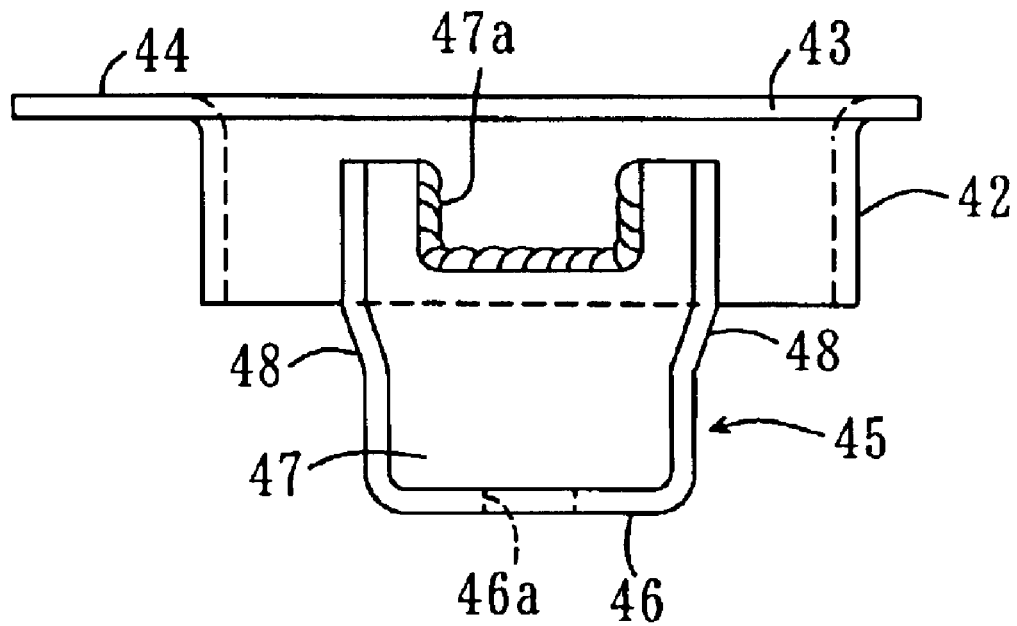
FIG. 8 is a view as viewed from the direction of arrow VIII of FIG. 6, showing the second metallic mounting member.

Embodiments of the present invention will next be described in detail with reference to the drawings.
First Embodiment:
First, a first embodiment of the present invention will be described. FIGS. 1 and 2 show a liquid-confined vibration isolator (hereinafter called merely a vibration isolator) of the first embodiment for use as an engine mount for a vehicle by means of a sectional view and a plan view. FIGS. 3 to 5 show a mount body of the vibration isolator by means of a sectional view, a plan view, and a side view. FIGS. 6 to 8 show a second metallic mounting member of the vibration isolator by means of a plan view, and side view as viewed from different directions.

A vibration isolator 10 includes a mount body 11 and a second metallic mounting member 41, which is press-fitted onto the mount body 11 to form a one-piece unitary member. The mount body 11 includes a first metallic mounting member 12; a cylindrical metallic body member 21, which is disposed away from the first metallic mounting member 12 in the vibration input direction and has a flange portion 26 protruding radially outward from a part of its axial end facing the first metallic mounting member 12 and a first protrusion 27 protruding radially outward from the remaining part of the axial end to a greater extent than does the flange portion 26; an elastic body portion 31, which is formed from a rubber elastic body and elastically connects the first metallic mounting member 12 and the metallic body member 21; and an orifice member 37 and a diaphragm member 38, which are press-fitted into the axially other end portion of the metallic body member 21 and serve as the seal portion.

An upper liquid chamber E1 and a lower liquid chamber E2 are formed in a space enclosed by the first metallic mounting member 12, the metallic body member 21, the elastic body portion 31, the orifice member 37, and the diaphragm member 38. The second metallic mounting member 41 includes a second protrusion 44, which protrudes from its end portion abutting the flange portion 26 and is superposed on the first protrusion 27 to thereby form a stopper portion S. The second metallic mounting member 41 is fixedly press-fitted onto the metallic body member 21. Notably, in the following description, the positional relationship among members and portions of the vibration isolator along the vertical direction follows that shown in FIGS. 1 and 3.

As shown in FIGS. 3 to 5, the first metallic mounting member 12 substantially assumes an inverted conical shape and has a planar portion 13 on its top end. Two diametrally opposite circumferential parts of the planar portion 13 are slightly cut away such that the cut lines are substantially in parallel, and another circumferential part perpendicular to the two circumferential part is also cut away, whereby the planar portion 13 assumes an irregular planar shape. A pair of elongated positioning plate portions 14 are fixedly attached to the upper surface of the planar portion 13 in opposition to each other while being aligned with the corresponding diametrally opposite cut lines. The inner side of each positioning plate portion 14 extends from one end (the right-hand end in FIG. 4) to the other end (the left-hand end in FIG. 4) while being inclined such that the distance between the facing inner sides of the positioning plate portions 14 increases slightly in a continuous manner toward the left in FIG. 4. The paired positioning plate portions 14 are used to position the first metallic mounting member 12 in relation to an engine bracket 2, which will be described later, when the first metallic mounting member 12 is to be fixedly attached to the bracket 2. A tapped mounting hole 15 is formed at the center of the first metallic mounting member 12 while extending through the planar portion 13 and reaching near the vertex of the inverted conical shape. The first metallic mounting member 12 is disposed in relation to the metallic body member 21 such that the paired positioning plate portions 14 are in parallel with the protruding direction of the first protrusion 27 of the metallic body member 21.

The metallic body member 21 includes a substantially cylindrical barrel portion 22; a circular flange portion 26 extending radially outward from a circumferential portion of the opening at an upper end (one end) of the barrel portion 22; and the first protrusion 27 extending radially outward from the remaining circumferential portion of the opening to a greater extent than does the flange portion 26. The barrel portion 22 includes a large-diameter portion 23 extending downward from its upper end to an axially intermediate position; a medium-diameter portion 24 extending downward from the large-diameter portion 23 to near its lower end; and a small-diameter portion 25 extending downward from the medium-diameter portion 24. The small-diameter portion 25 includes a diameter-reduced portion 25a, which is an intermediate part thereof having a diameter smaller than that of an upper part thereof; and an inward bent portion 25b, which is a lowest part thereof and is slightly bent radially inward in an inclined manner. The diameter-reduced portion 25a and the inward bent portion 25b are formed through drawing after the orifice member 37 and the diaphragm member 38 are fitted into the barrel portion 22.

As shown in FIG. 4, the circular flange portion 26 protrudes radially outward from a part of the circumferential edge of the upper end of the large-diameter portion 23, which part is located substantially on the right-hand side of a line passing through the left-hand ends of the positioning plate portions 14. The first protrusion 27 protrudes radially outward from the remaining part of the circumferential edge of the upper end of the large-diameter portion 23 such that the outline thereof is tangent to that of the flange portion 26 at the boundary between the first protrusion 27 and the flange portion 26, thereby assuming a substantially trapezoidal shape as viewed from above. The metallic body member 21 is formed from a plate material by means of press forming (drawing). The bottom opening of the barrel portion 22A is formed by blanking out a bottom portion of the plate material in the process of press drawing.

The elastic body portion 31 formed from rubber elastic body is disposed at the upper end of the metallic body member 21; more specifically, in the large-diameter portion 23 along the entire circumferential inner surface thereof, thereby plugging the upper end opening of the large-diameter portion 23. The elastic body portion 31 protrudes axially outward from the upper end of the metallic body member 21 in a truncated cone shape and includes an annular bottom portion 32, which is located substantially at the lower end position of the large-diameter portion 23 of the metallic body member 21 and slightly extends radially inward. A substantially conical recess 33 is formed in the elastic body portion 31 to be located inside the annular bottom portion 3 and centered at the center axis. An inverted conical shape portion of the first metallic mounting member 12 is coaxially embedded in the elastic body portion 31 at a truncated part of the truncated cone shape of the elastic body portion 31. The elastic body portion 31 includes a thin-walled covering elastic body portion 34, which integrally extends downward from the lower end of the elastic body portion 31 along the inner circumferential surface of the medium-diameter portion 24 of the metallic body member 21 down to a substantially middle position of the small-diameter portion 25. The elastic body portion 31 also includes a thin-walled portion 35, which slightly extends on the flange portion 26 along the entire circumference of the flange portion 26.

A thick-walled stopper covering portion 36 of a rubber elastic body is formed integrally with the thin-walled portion 35 of the elastic body portion 31 while protruding onto the first protrusion 27. The stopper covering portion 36 includes a thick-walled upper sandwich portion 36a, which has a rectangular shape as viewed from above and is bonded to the upper surface of the first protrusion 27 excluding opposite side portions of the upper surface; a connection portion 36b, which slightly extends downward from the outer end of the upper sandwich portion 36a; and a thick-walled lower sandwich portion 36c, which extends radially inward from the lower end of the connection portion 36b while facing the upper sandwich portion 36a. A clearance 39 is provided between the lower sandwich portion 36c and the first protrusion 27 in order to receive the second protrusion 44 of the second metallic mounting member 41, which will be described later. The elastic body portion 31 and the stopper covering portion 36 are formed unitarily by means of rubber vulcanization molding.

The orifice member 37 and the diaphragm member 38, which serve as the seal portion, are fitted coaxially into the barrel portion 22 while being located within an internal space of the barrel portion 22 including the covering elastic body portion 34 and extending down to near the lower end of the barrel portion 22; and the orifice member 37 is located axially inside the diaphragm member 38. The orifice member 37 assumes a disklike shape and has an orifice path 37a with a cross section resembling a squarish letter U formed along a circumferential portion thereof. One end of the orifice path 37a opens axially upward (into an upper liquid chamber E1), thereby forming an upper opening portion 37b, whereas the other end of the orifice path 37a opens axially downward (into a lower liquid chamber E2), thereby forming a lower opening portion 37c. The substantially conical recess 33 formed in the elastic body portion 31 is bounded by the orifice member 37 to become the upper liquid chamber E1. The diaphragm member 38 includes a metallic ring element 38a and a rubber membrane 38b, which is disposed inside the metallic ring element 38a and protrudes axially in one direction. The diaphragm member 38 is arranged such that the membrane 38b protrudes toward the orifice member 37. The diaphragm member 38 and the orifice member 37 define the lower liquid chamber E2.

After the orifice member 37 and the diaphragm member 38 are press-fitted into the barrel portion 22, the lower half of the small-diameter portion 25 undergoes drawing to thereby become the diameter-reduced portion 25a. Then, the bottom end part of the diameter-reduced portion 25a is slightly bent radially inward to thereby become the inward bent portion 25b. Thus, the orifice member 37 and the diaphragm member 38 are tightly retained within the barrel portion 22 and secured by means of the inward bent portion 25b, thereby preventing removal thereof from the metallic body member 21.

The mount body 11 is formed in the following manner. First, the first metallic mounting member 12 and the metallic body member 21 are set in a predetermined mold (not shown). Then, a rubber elastic-body material is injected into the mold, followed by vulcanization molding. As a result, the elastic body portion 31 and the stopper covering portion 36 are formed integrally. The thus-molded article is immersed in liquid, and the orifice member 37 and the diaphragm member 38 are sequentially fitted into the barrel portion 22 to thereby confine liquid within the upper and lower liquid chambers E1 and E2. Then, the small-diameter portion 25 of the metallic body member 21 is subjected to drawing, thereby yielding the mount body 11. Notably, liquid to be confined within the upper and lower liquid chambers E1 and E2 is an incompressible liquid. Examples of such an incompressible liquid include water, alkylene glycol, polyalkylene glycol, and silicone oil. Particularly, in order to effectively yield a vibration-isolating effect on the basis of resonance of liquid, liquid having a low viscosity of not greater than 0.1 Pa·s is preferred.

As shown in FIGS. 6 to 8, the second metallic mounting member 41 is formed from a metallic plate thicker than the metallic body member 21. The second metallic mounting member 41 includes a cylindrical portion 42, which has an axial length substantially half that of the barrel portion 22; and a flange portion 43 and the second protrusion 44, which extend radially outward from an opening portion at one axial end (upper end) of the cylindrical portion 42. The inside diameter of the cylindrical portion 42 is slightly smaller than the outside diameter of the large-diameter portion 23 of the metallic body member 21. The flange portion 43 and the second protrusion 44 are substantially identical in outline with the flange portion 26 and the first protrusion 27, respectively, of the metallic body member 21. A pair of anchoring members 45 are welded to the outer cylindrical surface of the cylindrical portion 42 in regions corresponding to the boundaries between the flange portion 43 and the second protrusion 44.

Each anchoring member 45 includes a bottom plate portion 46, an attachment plate portion 47, and a pair of side plate portions 48. The bottom plate portion 46 assumes an irregular shape such that a corner of a rectangle is cut away along a slightly curved line. The attachment plate portion 47 stands vertically from a side of the bottom plate portion 46 opposite the curvedly cut side of the bottom plate portion 46. Each of the side plate portions 48 connects a side edge part of the bottom plate portion 46 and that of the attachment plate portion 47. A mounting hole 46a is formed at the center of the bottom plate portion 46 while extending through the bottom plate portion 46. The attachment plate portion 47 is cylindrically curved so as to come in close contact with the cylindrical portion 42. In order to reduce the weight of the anchoring member 45, a rectangular cutout 47a is formed at an upper end part of the attachment plate portion 47. Each anchoring member 45 is welded to the cylindrical portion 42 such that a substantially upper half of the attachment plate portion 47 is welded to the cylindrical portion 42, while the lower half of the attachment plate portion 47 protrudes in opposition to the flange portion 43 of the cylindrical portion 42. The cylindrical portion 42 and the paired anchoring member 45—which constitute the second metallic mounting member 41—are each formed from a single metallic plate by means of press forming (drawing).

The second metallic mounting member 41 is press-fitted, from the flange portion 43, onto the mount body 11 from underneath. While the lower sandwich portion 36c of the stopper covering portion 36 is forcibly bent outward so as to be opened widely, the second protrusion 44 of the second metallic mounting member 41 is superposed on the first protrusion 27 of the metallic body member 21. Subsequently, the outwardly opened lower sandwich portion 36c is released so as to be restored to the original condition by means of an elastic reaction force, whereby the lower sandwich portion 36c is superposed on the second protrusion 44. As a result, as shown in FIGS. 1 and 2, while the stopper portion S composed of the first protrusion 27 and the second protrusion 44 is sandwiched between the upper and lower sandwich portions 36a and 36c of the stopper covering portion 36, the second metallic mounting member 41 is firmly attached to the mount body 11, thereby yielding the vibration isolator 10.

Figure 9:
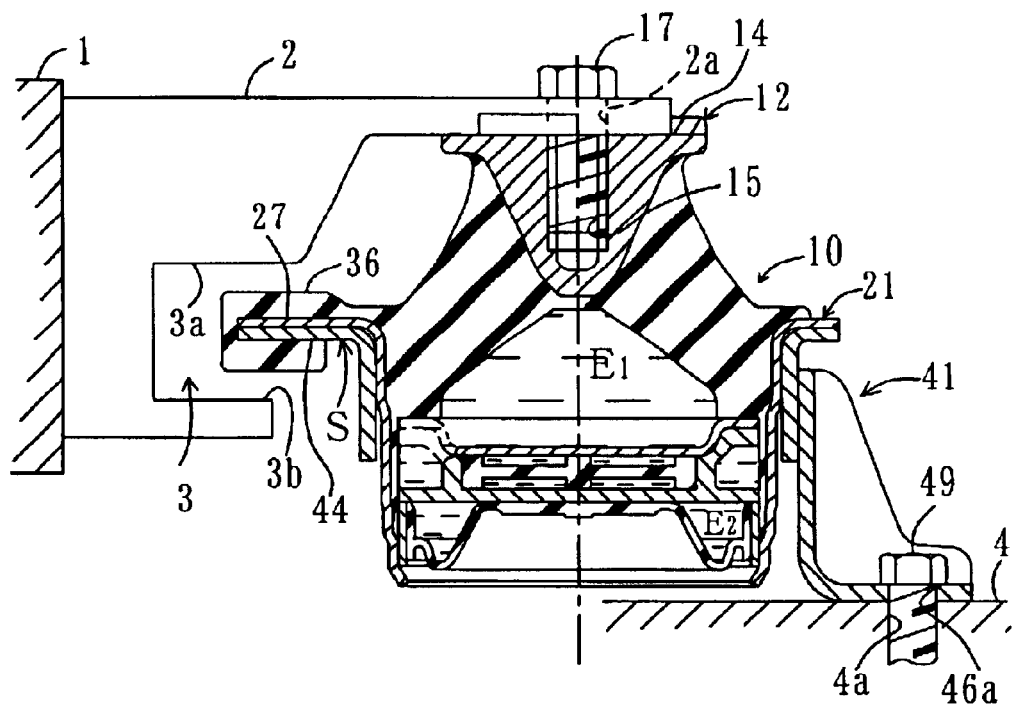
FIG. 9 is a partially sectional view showing a state in which the vibration isolator is mounted on a vehicle.

The thus-formed vibration isolator 10 is mounted on a vehicle in the following procedure. First, as shown in FIG. 9, a bracket 2 of an engine 1, which is one opponent member, is sandwiched between the paired positioning plate portions 14 of the first metallic mounting member 12. A bolt 17 is passed through a mounting hole 2a formed in the bracket 2 and screwed in the mounting hole 15 formed in the first metallic mounting member 12, whereby the first metallic mounting member 12 is attached to the bracket 2. At this time, the stopper portion S—which is composed of the first and second protrusions 27 and 44 covered with the stopper covering portion 36—is disposed within a recess 3 formed in the bracket 2 and having the shape of a squarish letter U while a predetermined clearance is formed between the stopper portion S and an upper bound contact portion 3a of the recess 3 and between the stopper portion S and a lower rebound contact portion 3b. Next, the paired anchoring members 45 of the second metallic mounting member 41 are positioned on a vehicle body member 4, which is the other opponent member. A bolt 49 is passed through the mounting hole 46a formed in each bottom plate portion 46 and screwed in a mounting hole 4a formed in the vehicle body member 4, whereby the second metallic mounting member 41 is mounted on the vehicle body member 4.

In the vibration isolator 10 attached to the engine bracket 2 and the vehicle body member 4, when vibration is input vertically (in the vertical direction of FIG. 9) such that the vertically moving stopper portion S does not come into contact with the bound contact portion 3a and the rebound contact portion 3b, the vibration isolator 10 exhibits its intrinsic vibration-damping action, thereby suppressing transmission of vibration from the engine to the vehicle body. When excessive vibration is input from the vehicle body or when the engine moves greatly as in the case of starting the vehicle or sharply accelerating/decelerating the vehicle, the stopper portion S covered with the stopper covering portion 36 come into contact with the bound contact portion 3a and the rebound contact portion 3b of the bracket 2, thereby suppressing an excessively great relative displacement between the engine and the vehicle body.

In the thus-configured first embodiment, the stopper portion S is configured through superposition of the first protrusion 27 of the metallic body member 21 and the second protrusion 44 of the second metallic mounting member 41, thereby obviating the need for preparing a discrete stopper member and thus simplifying the structure of the stopper portion S and lowering manufacturing cost of the stopper portion S. Also, the structure of superposing the first protrusion 27 of the metallic body member 21 and the second protrusion 44 of the second metallic mounting member 41 imparts sufficient strength to the stopper portion S. Therefore, the weight of the metallic body member 21 and the second metallic mounting member 41 can be reduced, and the total weight of the vibration isolator 10 can be reduced.

Also, in the vibration isolator 10, the second metallic mounting member 41 is fixedly press-fitted onto the metallic body member 21, thereby obviating complicated press working such as bending and crimping. Therefore, assembly of the vibration isolator 10 is simplified, thereby lowering manufacturing cost. Further, the stopper portion S is configured through superposition of the first protrusion 27 of the metallic body member 21 and the second protrusion 44 of the second metallic mounting member 41, which are covered and held together by the stopper covering portion 36, thereby reliably preventing removal of the second metallic mounting member 41 from the metallic body member 21, which could otherwise result from the second metallic mounting member 41 being subjected to an axial force induced by vibration input to the vibration isolator 10. Also, the stopper covering portion 36 and the elastic body portion 31 are formed integrally through vulcanization molding, thereby eliminating a step of independently forming the stopper covering portion 36 and thus reducing manufacturing cost of the vibration isolator 10.

Second Embodiment:

Next will be described a second embodiment of the present invention.

Figure 10:
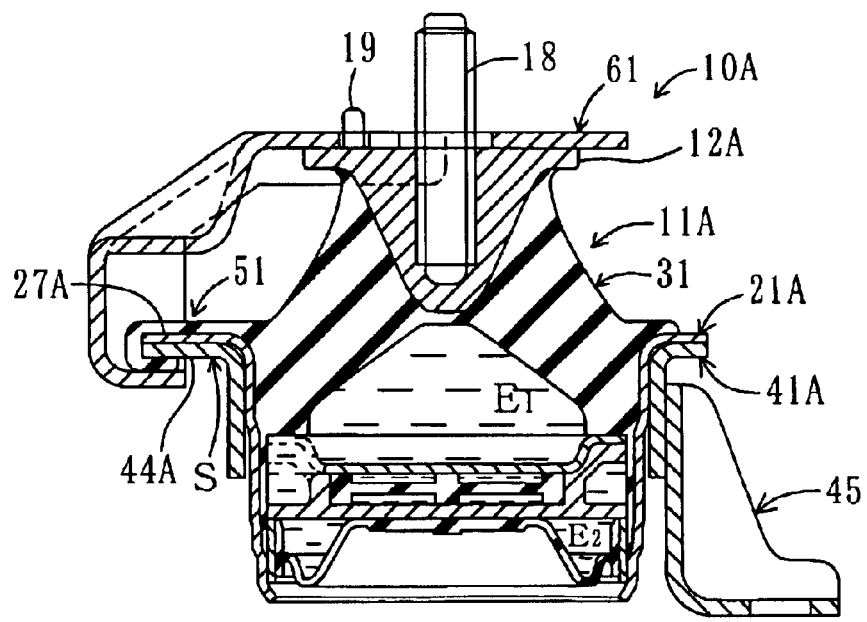
FIG. 10 is a sectional view taken along line X—X of FIG. 11, showing a liquid-confined vibration isolator according to a second embodiment of the present invention.
Figure 11:
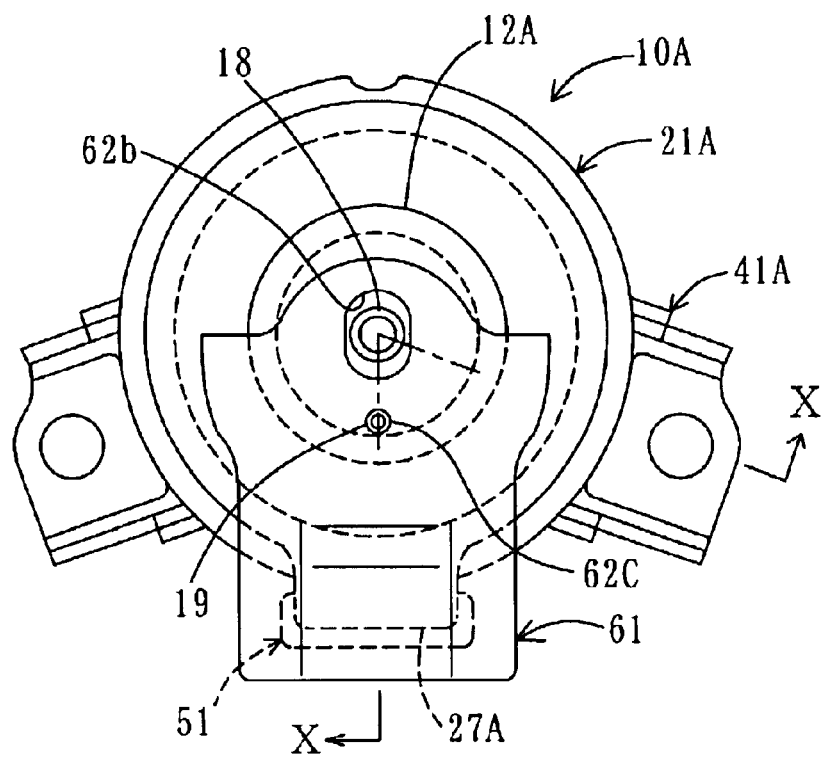
FIG. 11 is a plan view showing the vibration isolator of FIG. 10.
Figure 12:
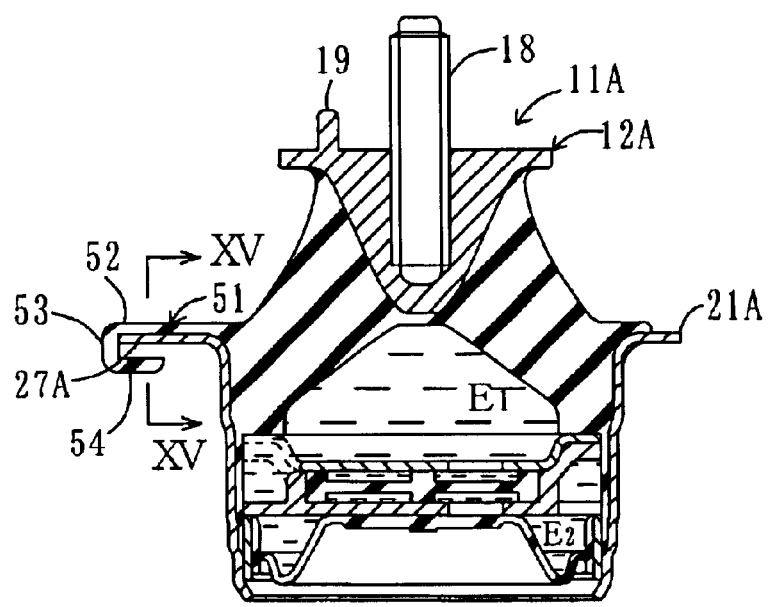
FIG. 12 is a sectional view taken along line XII—XII of FIG. 13, showing a mount body of the vibration isolator of FIG. 10.
Figure 13:
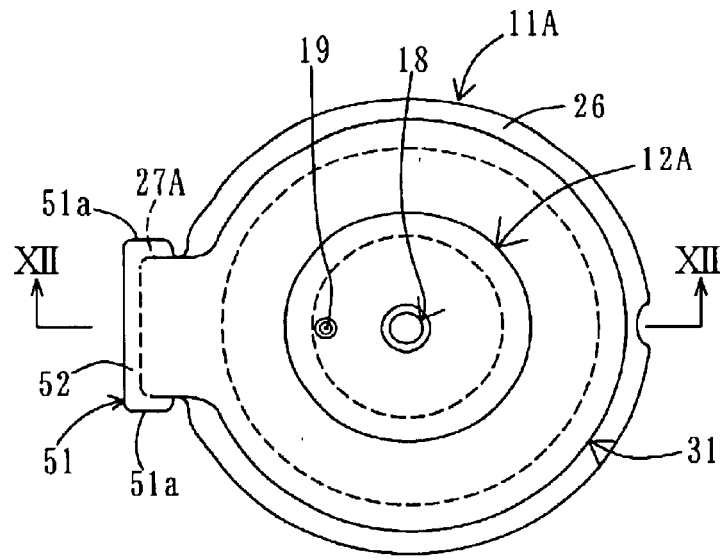
FIG. 13 is a plan view showing the mount body of FIG. 12.
Figure 14:
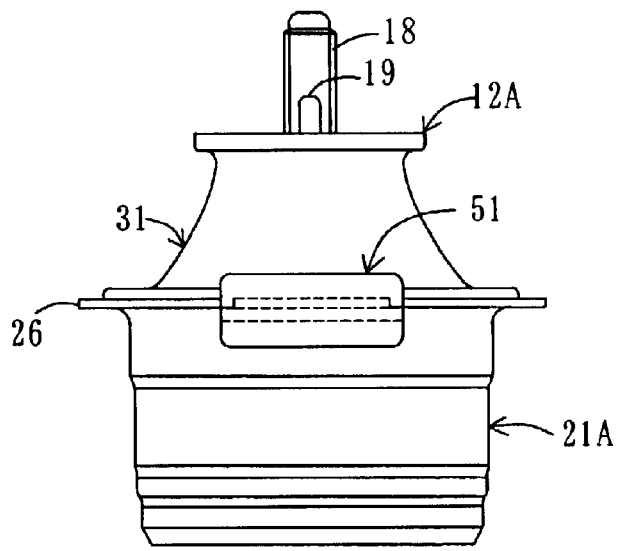
FIG. 14 is a left-hand side view showing the mount body of FIG. 12.

FIGS. 10 and 11 show a vibration isolator 10A of the second embodiment by means of a sectional view and a plan view. FIGS. 12 to 15 show a mount body 11A of the vibration isolator 10A by means of a sectional view, a plan view, a side view, and a partial sectional view. As shown in FIGS. 10 and 11, the second embodiment differs from the first embodiment in that the structure of a stopper covering portion 51 of a rubber elastic body for covering the stopper portion S differs from that of the stopper covering portion 36, and thus a first protrusion 27A of a metallic body member 21A and a second protrusion 44A of a second metallic mounting member 41A are modified in shape accordingly. Further, in the second embodiment, a metallic stopper member 61 for limiting the range of movement of the stopper portion S is attached to a first metallic mounting member 12A.

The first protrusion 27A protrudes, in a rectangular shape as viewed from above, radially outward from a portion of the upper circumferential end of the barrel portion 22 excluding the circular flange portion 26 and having a central angle of about 45°, to a greater extent than does the flange portion 26. A second protrusion 44A of the second metallic mounting member 41A protrudes from the cylindrical portion 42, in a rectangular shape as viewed from above identical with that of the first protrusion 27A. The first metallic mounting member 12A does not have the positioning plate portions 14 employed in the first embodiment, but instead has a threaded mounting rod 18 screwed in the mounting hole 15 in such a manner as to protrude vertically upward. Further, an engagement protrusion 19 is provided in a vertically protruding condition on the first metallic mounting member 12A at a position located a predetermined distance away from the mounting hole 15 toward the first protrusion 27A.

Figure 15:
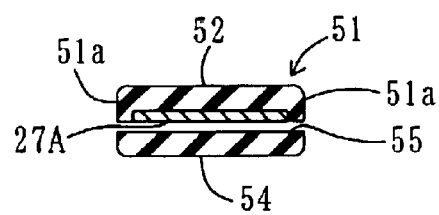
FIG. 15 is a sectional view taken along line XV—XV of FIG. 12, showing a portion of the mount body of FIG. 12.

As shown in FIGS. 12 to 15, as in the case of the stopper covering portion 36, the stopper covering portion 51 is a thick-walled portion formed from a rubber elastic body and having a rectangular shape as viewed from above. The stopper covering portion 51 is formed integrally with the thin-walled portion 35 of the elastic body portion 31 while protruding onto and covering the first protrusion 27A. The stopper covering portion 51 includes a thick-walled upper sandwich portion 52, which is bonded to the upper surface of the first protrusion 27; a connection portion 53, which extends slightly downward from the outer end of the upper sandwich portion 52; and a thick-walled lower sandwich portion 54, which extends radially inward from the lower end of the connection portion 53 while facing the upper sandwich portion 52. Thus, the stopper covering portion 51 is a unitary portion having a cross section resembling a squarish letter U. As shown in FIG. 15, the stopper covering portion 51 further includes a pair of side covering portions 51a, which extend outward from the corresponding opposite side edge parts of the upper sandwich portion 52 and cover the corresponding opposite side portions of the first protrusion 27A. A clearance 55 is provided between the lower sandwich portion 54 and the first protrusion 27A in order to receive the second protrusion 44A of the second metallic mounting member 41. As in the case of the first embodiment, the stopper covering portion 51 and the elastic body portion 31 are formed integrally by means of rubber vulcanization molding.

Figure 16A:
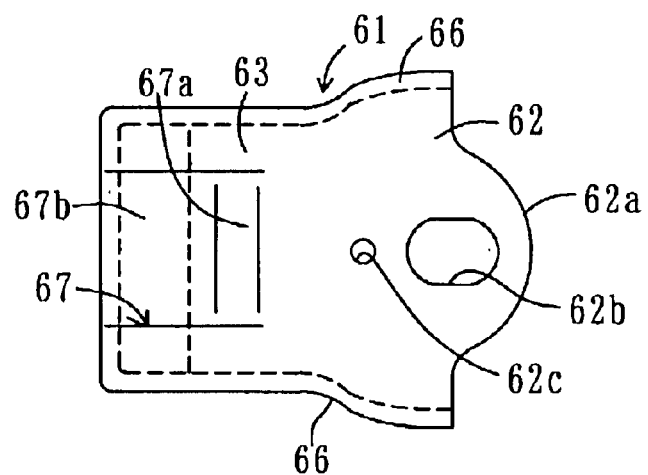
FIGS. 16A to 16C are a plan view, a front view, and a right-hand side view, respectively, showing a metallic stopper member of the vibration isolator of FIG. 10.
Figure 16B:
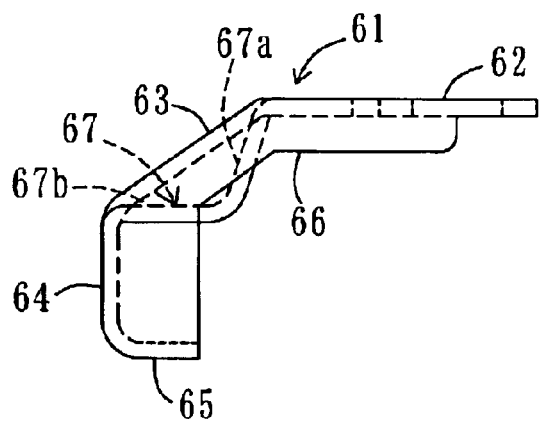
Figure 16C:
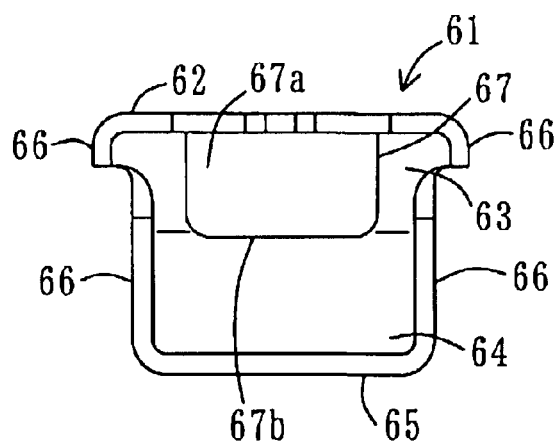

As shown in FIGS. 16A to 16C, the metallic stopper member 61 is formed from an elongated metal plate by means of press working. The metal plate is bent toward the same side at positions between the opposite ends thereof, thereby integrally forming a horizontal plate portion 62, an inclined plate portion 63, a vertical plate portion 64, and a second horizontal plate portion 65. The metallic stopper member 61 further includes a pair of flange portions 66, which are bent perpendicularly toward the same side at opposite side edges of the horizontal plate portion 62, at those of the inclined plate portion 63, at those of the vertical plate portion 64, and at those of the second horizontal plate portion 65. A substantially half of the horizontal plate portion 62 extending from one end thereof along the longitudinal direction fans out toward the one end such that the opposite side edges of the fan shape are curved. Further, the one end assumes the form of an arcuate protrusion, thereby forming a protrusion 62a. A longitudinally elongated circular anchorage hole 62b is formed in the one end of the horizontal plate portion 62, including the protrusion 62a, at a widthwise middle position thereof in such a manner that the anchorage hole 62b penetrates the horizontal plate portion 62. An engagement hole 62c is formed in the horizontal plate portion 62 in such a manner that the engagement hole 62c penetrates the horizontal plate portion 62 and is located slightly away from the anchorage hole 62b in the longitudinal direction.

The inclined plate portion 63 is inclined about 30° with respect to the horizontal plate portion 62 and has a recess 67 sunken toward the same side as that toward which bending is performed to form the inclined plate portion 63, while unsunken narrow regions are present on laterally opposite sides of the recess 67. The recess 67 is defined by an inclined portion 67a extending from the horizontal plate portion 62 and inclined at a steep angle of about 80° with respect to the horizontal plate portion 62, and a horizontal portion 67b extending from the inclined portion 67a in parallel with the horizontal plate portion 62. The vertical plate portion 64 extends from the inclined plate portion 63 in such a manner as to be bent toward the same side as the inclined plate portion 63 is bent, so as to be perpendicular to the horizontal plate portion 62. The second horizontal plate portion 65 extends from the vertical plate portion 64 in such a manner as to be bent perpendicularly to the vertical plate portion 64 toward the same side as the vertical plate portion 64 is bent, to thereby face the horizontal portion 67b in parallel with each other. The longitudinal length of the second horizontal plate portion 65 is slightly shorter than that of the horizontal portion 67b. The distance between the horizontal portion 67b and the second horizontal plate portion 65 is not less than two times the thickness of the stopper covering portion 51. Each of the flange portions 66 extends along the horizontal plate portion 62 and the inclined plate portion 63 while the same width is maintained. Each flange portion 66 extends along the vertical plate portion 64 from the boundary between the inclined plate portion 63 and the vertical plate portion 64 to the second horizontal plate portion 65 while its width is expanded so as to be equal to the longitudinal length of the second horizontal plate portion 65.

Figure 17:
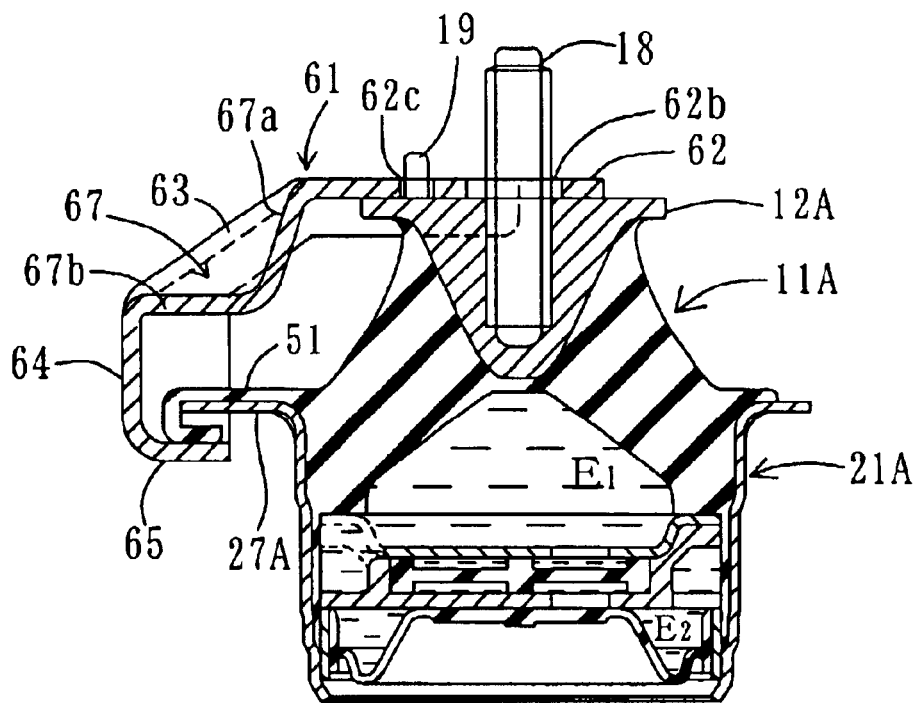
FIG. 17 is a sectional view taken along line XVII—XVII of FIG. 18, showing a state in which the metallic stopper member is attached to the mount body of FIG. 12.
Figure 18:
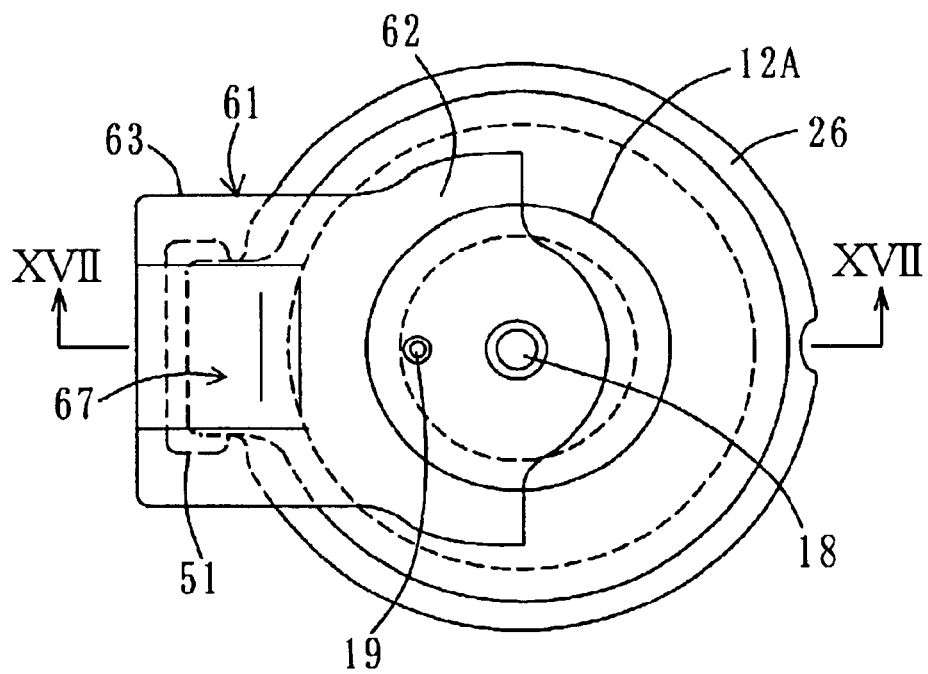
FIG. 18 is a plan view showing a state in which the metallic stopper member is attached to the mount body of FIG. 12.
Figure 19:
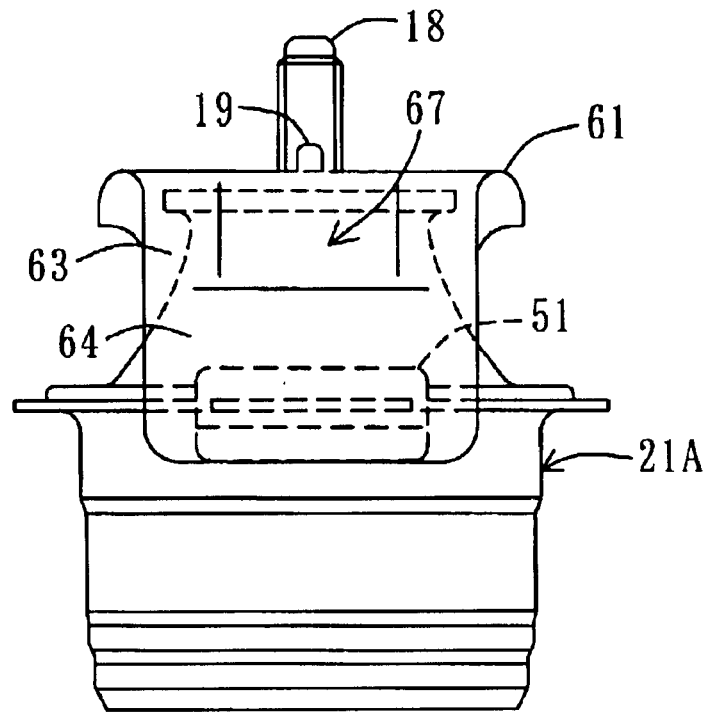
FIG. 19 is a left-hand side view showing a state in which the metallic stopper member is attached to the mount body of FIG. 12.

As shown in FIGS. 17 to 19, the metallic stopper member 61 is fixedly attached to the first metallic mounting member 12A in the following manner. The metallic stopper member 61 is placed on the first metallic mounting member 12A in such a manner that the mounting rod 18 of the first metallic mounting member 12A is inserted into the anchorage hole 62b of the horizontal plate portion 62, and the engagement protrusion 19 of the first metallic mounting member 12 is fitted into the engagement hole 62c of the horizontal plate portion 62 in a state in which the stopper covering portion 51 and the stopper portion S are disposed within a space enclosed by the inclined plate portion 63, the vertical plate portion 64, the second horizontal portion 65, and the flange portions 66. Subsequently, the metallic stopper member 61 is fixed to the first metallic mounting member 12A by use of a nut (not shown). Subsequently, to the metallic body member 21A of the mount body 11A to which the metallic stopper member 61 has been fixedly attached as mentioned above, the second metallic mounting member 41A is fixedly attached in a state in which the second protrusion 44A is inserted between the upper sandwich portion 52 and the lower sandwich portion 54 of the stopper covering portion 51 and superposed on the first protrusion 27A. Thus, the vibration isolator 10A is obtained.

The thus-formed vibration isolator 10A is mounted on a vehicle in the following procedure. First, while the vibration isolator 10A is oriented such that the stopper portion S protrudes in the right-and-left direction of a vehicle, the mounting rod 18 of the first metallic mounting member 12A is inserted into an unillustrated bracket (one opponent member) of an engine, and a nut is screwed to the mounting rod 18, thereby attaching the first metallic mounting member 12A to the bracket. The second metallic mounting member 41A is mounted on an unillustrated vehicle body member (the other opponent member) in a manner similar to that of the first embodiment. Thus, the stopper portion S covered with the stopper covering portion 51 is located at a vertically intermediate position between the horizontal portion 67b and the second horizontal plate portion 65 of the metallic stopper member 61. Other structural features of the vibration isolator 10A are similar to those of the first embodiment, and structural features common to the first and second embodiments are denoted by common reference numerals.

The thus-configured second embodiment functions in the following manner. As in the case of the first embodiment, when excessively large vibration is input in the vertical direction, the stopper portion S comes into contact with the metallic stopper member 61, thereby suppressing the relative displacement between the engine and the vehicle body to a level falling within an appropriate range. Since the stopper covering portion 51 also covers the opposite side parts of the stopper portion S, even when a vehicle movement in the front-and-rear direction causes the stopper portion S to come into contact with the flange portions 66, neither of them is damaged. Further, when the stopper portion S moves greatly in the front-and-rear direction of the vehicle, the side covering portions 51a, which cover the laterally opposite side parts of the stopper portion S, come into contact with the flange portions 66 of the metallic stopper member 61, thereby suppressing an excessive displacement of the stopper portion S. Therefore, the reliability of the vibration isolator 10A is favorably maintained.

The vibration isolator 10A of the second embodiment employs the metallic stopper member 61. However, in place of the metallic stopper member 61, contact portions may be provided on the engine bracket shown in the first embodiment in such a manner that the contact portions are disposed at different positions along the front-and-rear direction of a vehicle. In this case, contact of the stopper portion S with the contact portions of the bracket suppresses an excessive displacement of the stopper portion S in the front-and-rear direction.

Third Embodiment:

Next will be described a third embodiment of the present invention.

Figure 20:
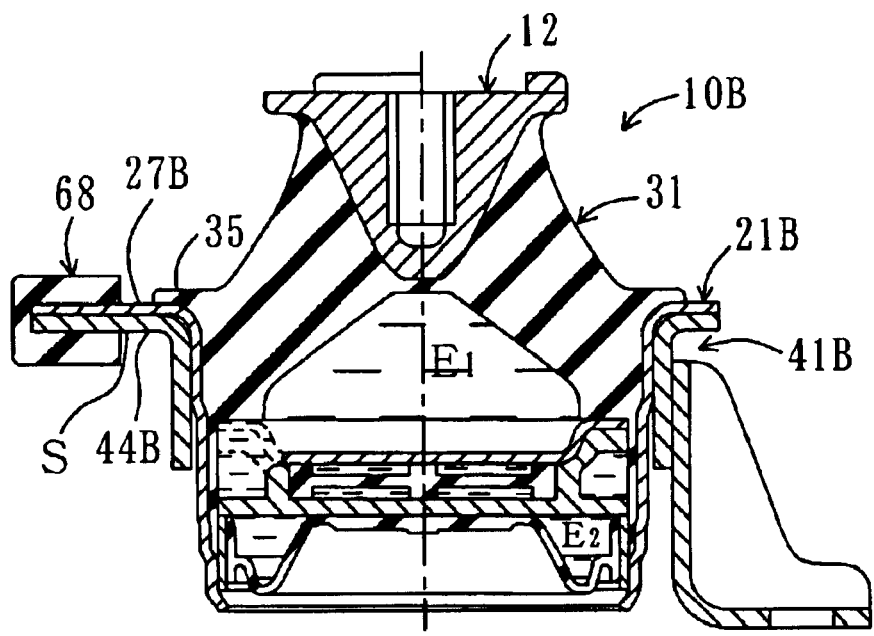
FIG. 20 is a sectional view taken along line Y—Y of FIG. 21, showing a liquid-confined vibration isolator according to a third embodiment of the present invention.
Figure 21:
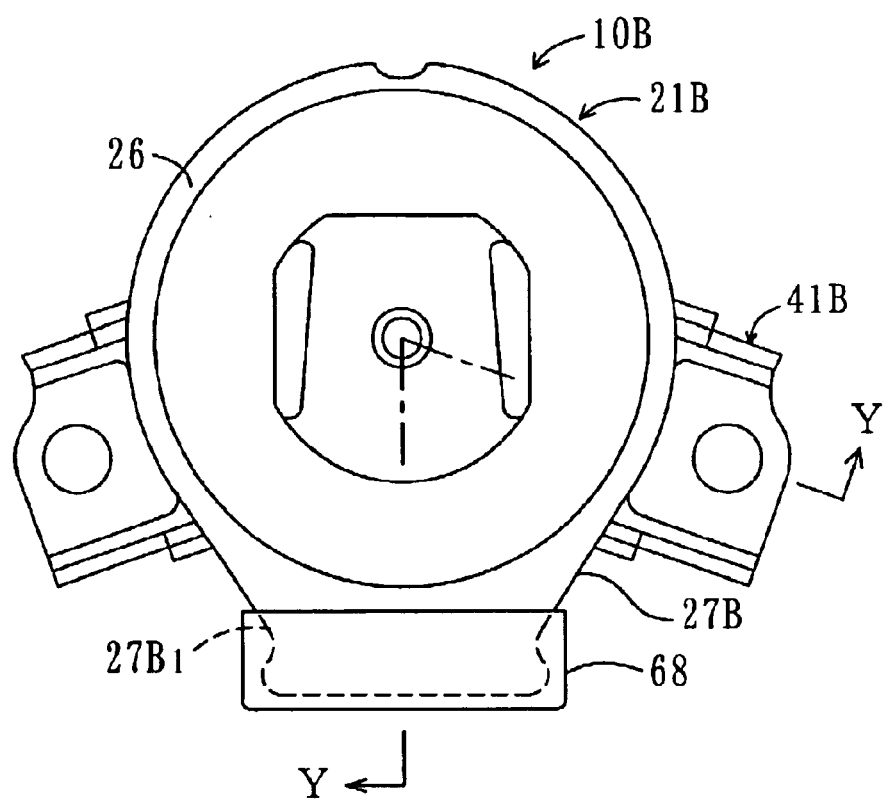
FIG. 21 is a plan view showing the vibration isolator of FIG. 20.
Figure 22:
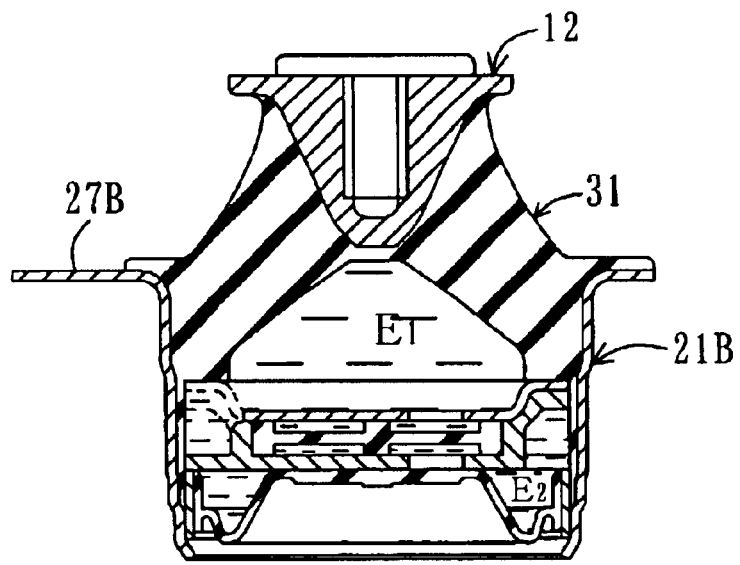
FIG. 22 is a sectional view taken along line YII—YII of FIG. 23, showing a mount body of the vibration isolator of FIG. 20.

FIGS. 20 and 21 show a vibration isolator 10B of the third embodiment by means of a sectional view and a plan view. FIGS. 22 to 24 show a mount body 11B of the vibration isolator 10B by means of a sectional view, a plan view, and a side view. As shown in FIGS. 20 and 21, the third embodiment differs from the first embodiment in that a stopper covering portion of a rubber elastic body for covering the stopper portion S is implemented by a discrete stopper covering member 68, and thus a first protrusion 27B of a metallic body member 21B and a second protrusion 44B of a second metallic mounting member 41B are modified in shape accordingly.

As shown in FIG. 25, the stopper covering member 68 is a discrete elongated thick-plate member of a rubber elastic body formed separately from the elastic body portion 31. The stopper covering member 68 has a slitlike reception recess 69, which opens at one lateral end thereof and extends toward the other lateral end thereof, and laterally extending covering portions 68a are provided at opposite longitudinal ends of the stopper covering member 68. The reception recess 69 has a length equal to the width of the first protrusion 27B of the metallic body member 21 and that of the second protrusion 44B of the second metallic mounting member 41B, and a height equal to the sum of the thickness of the first protrusion 27B and that of the second protrusion 44B. Round protrusions 69a protrude inward from the opposite longitudinal ends of the reception recess 69 in a mutually facing condition. The opposite sides of the first protrusion 27B of the metallic body member 21B are not straight, but include respective round recesses 27B1 so as to coincide with the shape of the reception recess 69. This outline feature of the first protrusion 27B also applies to the second protrusion 44B of the second metallic mounting member 41B. Other structural features of the vibration isolator 10B are similar to those of the first embodiment, and structural features common to the first and third embodiments are denoted by common reference numerals.

As in the case of the first embodiment, the thus-configured third embodiment can suppress displacement associated with excessively large vibration input in the vertical direction to a level falling within an appropriate range. Although an additional step is involved to form the discrete stopper covering member 68 separately from the elastic body portion 31, when the first protrusion 27B and the second protrusion 44B are to be superposed in the course of press-fitting the second metallic mounting member 41B onto the metallic body member 21B, a step of bending the stopper covering portion becomes unnecessary. Thus, press-fitting the second metallic mounting member 41B onto the metallic body member 21B can be simplified, and the stopper covering member 68 can be fixedly fitted onto the stopper portion S in an easy and reliable manner. Since the round protrusions 69a provided on the reception recess 69 of the stopper covering member 68 can be latched in the round recesses 27B1 of the first protrusion 27B and in round recesses of the second protrusion 44B, the stopper covering member 68 is fixedly attached to the stopper portion S in a reliable condition, thereby reliably preventing removal of the second metallic mounting member 41B from the metallic body member 21B.

Also, as in the case of the second embodiment, since the stopper covering member 68 covers the opposite side parts of the stopper portion S, even when a vehicle movement in the front-and-rear direction causes the stopper portion S to come into contact with an opponent member, neither of them is damaged. Further, when the stopper portion S moves greatly in the front-and-rear direction of the vehicle, the side covering portions 68a, which cover the laterally opposite side parts of the stopper portion S, come into contact with the opponent member, thereby suppressing an excessive displacement of the stopper portion S in the front-and-rear direction. Therefore, the reliability of the vibration isolator 10B is favorably maintained.

Fourth Embodiment:

Next will be described a fourth embodiment of the present invention.

Figure 26:
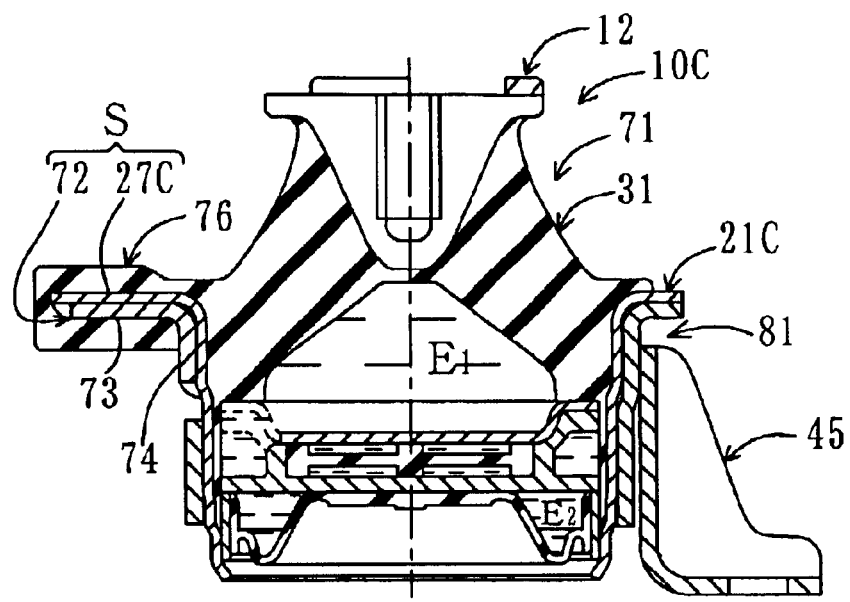
FIG. 26 is a sectional view taken along line YVI—YVI of FIG. 27, showing a liquid-confined vibration isolator according to a fourth embodiment of the present invention.
Figure 27:
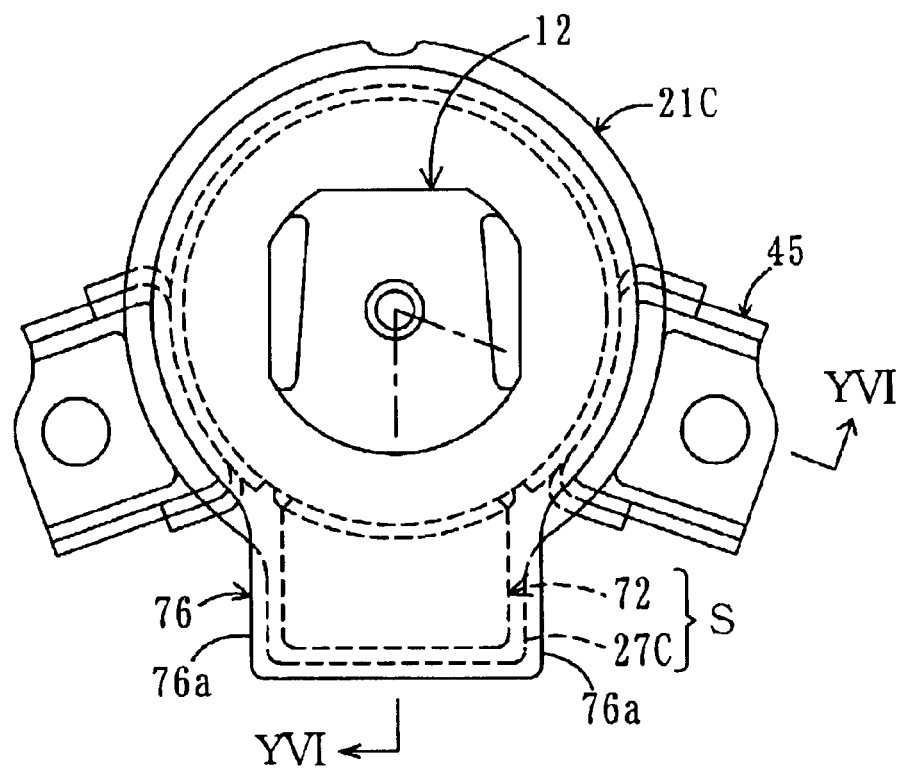
FIG. 27 is a plan view showing the vibration isolator of FIG. 26.
Figure 28:
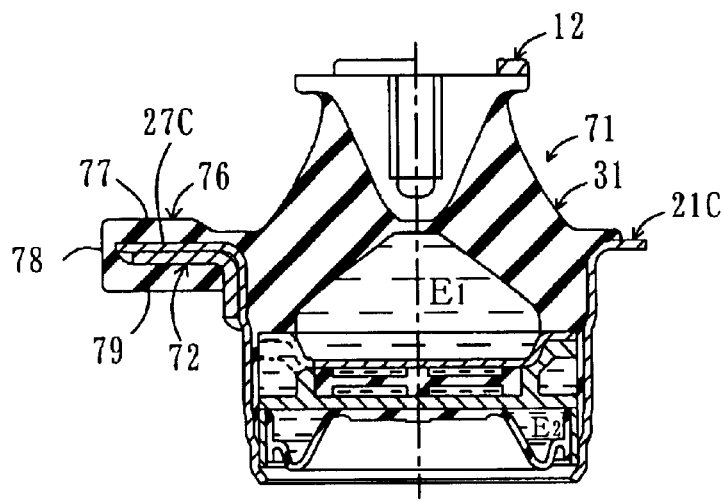
FIG. 28 is a sectional view showing a mount body of the vibration isolator of FIG. 26.

As shown in FIGS. 26 and 27, a vibration isolator 10C of the fourth embodiment is the vibration isolator 10 of the first embodiment whose mount body 11 and second metallic mounting member 41 are modified. As shown in FIG. 28, a mount body 71 is configured such that a metallic reinforcement member 72 is welded to the back surface of a rectangular first protrusion 27C of a metallic body member 21C and to a portion of the outer circumferential surface of the barrel portion 22 which extends from the back surface of the first protrusion 27C. The metallic reinforcement member 72 is a thick-walled metallic plate member thicker than the metallic body member 21C. The metallic reinforcement member 72 includes a substantially rectangular planar portion 73 having a width slightly narrower than that of the first protrusion 27C and a curved portion 74 extending perpendicularly from the planar portion 73 along a length substantially equal to that of the large-diameter portion 23 and curved according to the outer circumferential surface of the barrel portion 22.

As shown in FIG. 28, a stopper covering portion 76 formed from a rubber elastic body includes a thick-walled upper sandwich portion 77, which is bonded to the upper surface of the first protrusion 27C; a connection portion 78, which extends slightly downward from the outer end of the upper sandwich portion 77; and a thick-walled lower sandwich portion 79, which extends radially inward from the lower end of the connection portion 78 while being bonded to the planar portion 73 of the metallic reinforcement member 72. The stopper covering portion 76 is formed integrally by means of vulcanization molding while covering the first protrusion 27C and the metallic reinforcement member 72. The stopper covering portion 76 further includes a pair of side covering portions 76a, which cover the corresponding opposite side parts of the stopper portion S composed of the first protrusion 27C and the metallic reinforcement member 72. Other structural features of the mount body 71 are similar to those of the mount body 11 of the first embodiment, and structural features common to the first and fourth embodiments are denoted by common reference numerals.

Figure 29:
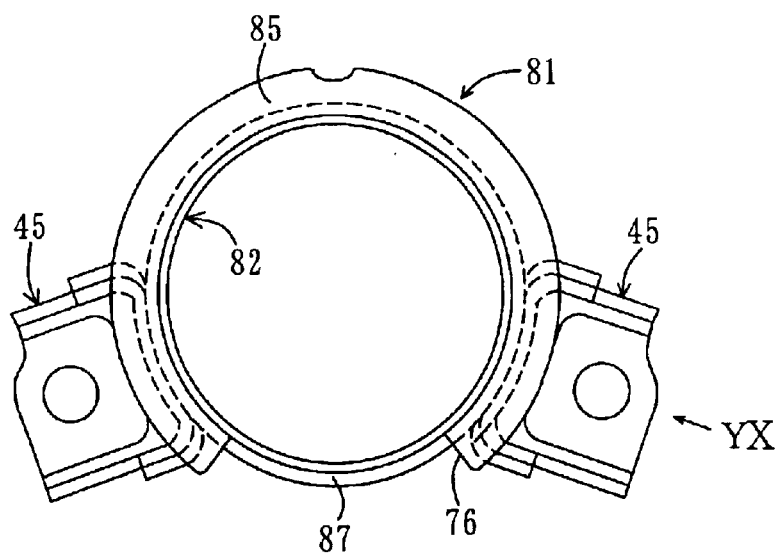
FIG. 29 is a plan view showing a second metallic mounting member of the vibration isolator of FIG. 26.
Figure 30:
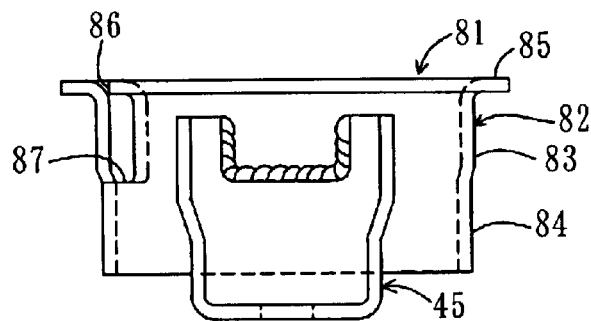
FIG. 30 is a view as viewed from the direction of arrow YX of FIG. 29, showing the second metallic mounting member.

As shown in FIGS. 29 and 30, the second metallic mounting member 81 assumes a structure substantially similar to that of the second metallic mounting member 41 of the first embodiment. A substantially cylindrical barrel portion 82 includes a large-diameter portion 83 and a small-diameter portion 84, which are arranged in the axial direction. The large-diameter portion 83 has an axial length substantially equal to that of the large-diameter portion 23 of the barrel portion 22. The small-diameter portion 84 is slightly smaller in diameter than the large-diameter portion 83 and has an axial length substantially equal to that of the medium-diameter portion 24 of the barrel portion 22. The inside diameter of the large-diameter portion 83 is slightly smaller than the outside diameter of the large-diameter portion 23, and the inside diameter of the small-diameter portion 84 is slightly smaller than the outside diameter of the medium-diameter portion 24. A flange portion 85 having a shape identical to that of the flange portion 43 of the first embodiment is integrally formed at the end of the large-diameter portion 83 while extending radially outward. In order to avoid interference with the first protrusion 27C and the metallic reinforcement member 72 when the second metallic mounting member 81 is press-fitted onto the metallic body member 21C, cutouts 86 and 87 are formed in the flange portion 85 and the barrel portion 82 accordingly. Other structural features of the second metallic mounting member 81 are similar to those of the second metallic mounting member 41 of the first embodiment, and structural features common to the first and fourth embodiments are denoted by common reference numerals.

The second metallic mounting member 81 is attached to the mount body 71 in the following manner. The second metallic mounting member 81 is press-fitted onto the mount body 71 from underneath while the cutouts 86 and 87 of the second metallic mounting member 81 are aligned with the first protrusion 27C of the mount body 71 and the metallic reinforcement member 72, whereby the large-diameter portion 83 is press-fitted onto the large-diameter portion 23, and the small-diameter portion 84 is press-fitted onto the medium-diameter portion 24. The cutouts 86 and 87 are disposed such that the first protrusion 27C and the metallic reinforcement member 72 are accommodated therein. Thus, the second metallic mounting member 81 is firmly attached to the mount body 71, thereby yielding the vibration isolator 10C. The vibration isolator 10C is mounted to a vehicle in a manner similar to that of the first embodiment.

In the thus-configured fourth embodiment, the stopper portion S is configured through superposition of the first protrusion 27C of the metallic body member 21C and the metallic reinforcement member 72, thereby obviating the need for preparing a discrete stopper member and thus simplifying the structure of the stopper portion S and lowering manufacturing cost of the stopper portion S. Also, the structure of superposing the first protrusion 27C of the metallic body member 21C and the metallic reinforcement member 72 imparts sufficient strength to the stopper portion S. Therefore, the weight of the metallic body member 21C and the second metallic mounting member 81 can be reduced, and the total weight of the vibration isolator 10C can be reduced. Also, as in the case of the second embodiment, since the stopper covering portion 76 also covers the opposite side parts of the stopper portion S, even when a vehicle movement in the front-and-rear direction causes the stopper portion S to come into contact with an opponent member, neither of them is damaged. Further, when the stopper portion S moves greatly in the front-and-rear direction of the vehicle, the side covering portions 76a, which cover the laterally opposite side parts of the stopper portion S, come into contact with the opponent member, thereby suppressing an excessive displacement of the stopper portion S in the front-and-rear direction. Therefore, the reliability of the vibration isolator 10C is favorably maintained.

Also, in the vibration isolator 10C, the second metallic mounting member 81 is fixedly press-fitted onto the metallic body member 21C, thereby obviating complicated press working such as bending and crimping. Therefore, assembly of the vibration isolator 10C is simplified, thereby lowering manufacturing cost. Also, the stopper covering portion 76 and the elastic body portion 31 are formed integrally through vulcanization molding, thereby eliminating a step of independently forming the stopper covering portion 76 and thus reducing manufacturing cost of the vibration isolator 10C.

In the present invention, metallic body member may have a plurality of stopper portions formed and arranged circumferentially on one axial end in the place of the one stopper portion. While the present invention has been described with reference to the first through fourth embodiments, the present inntion is not limited thereto, but may be modified as appropriate without departing from the spirit or scope of the invention. For example, the first metallic mounting member, the metallic body member, the elastic body portion of a rubber elastic body, and the second metallic mounting member can be modified in shape as appropriate. Also, in place of rubber elastic body, any other elastic body such as elastomer elastic body may be used. Those shown in the above-described embodiments are mere examples, and they may be modified in various manners without departing from the scope of the present invention.

What is claimed is:

1. A liquid-confined vibration isolator comprising:
   a first metallic mounting member;
   a cylindrical metallic body member disposed away from said first metallic mounting member in a vibration input direction, said metallic body member having a first protrusion protruding radially outward from one axial end thereof facing said first metallic mounting member;
   an elastic body portion elastically connecting said first metallic mounting member and said metallic body member and plugging the axial end of said metallic body member;
   a seal portion plugging an axially opposite end of said metallic body member to thereby define a liquid chamber in cooperation with said first metallic mounting member, said metallic body member and said elastic body portion;
   a cylindrical second metallic mounting member fixedly press-fitted onto said metallic body member and having a second protrusion protruding radially outward from one axial end thereof, said second protrusion and said first protrusion being in superposed direct engagement to thereby form a stopper portion; and
   a one-piece stopper-covering elastic-body portion covering both said first and second protrusions of said stopper portion.

2. A liquid-confined vibration isolator according to claim 1, wherein said stopper-covering elastic-body portion is formed integrally with said elastic body portion.

3. A liquid-confined vibration isolator according to claim 2, wherein said first and second protrusions constituting said stopper portion are disposed at the same circumferential position, and said stopper-covering elastic-body portion covers opposite side faces of said first and second protrusions in addition to opposite planar faces and protruding end faces of said first and second protrusions.

4. A liquid-confined vibration isolator according to claim 1, wherein said stopper-covering elastic-body portion is a discrete member formed separately from said elastic body portion and is fixedly fitted onto said stopper portion formed through superposition of said first and second protrusions.

* * * * *